Aug. 20, 1929.     V. ROYLE     1,724,967
STRAINER HEAD FOR TUBING MACHINES
Filed June 26, 1926
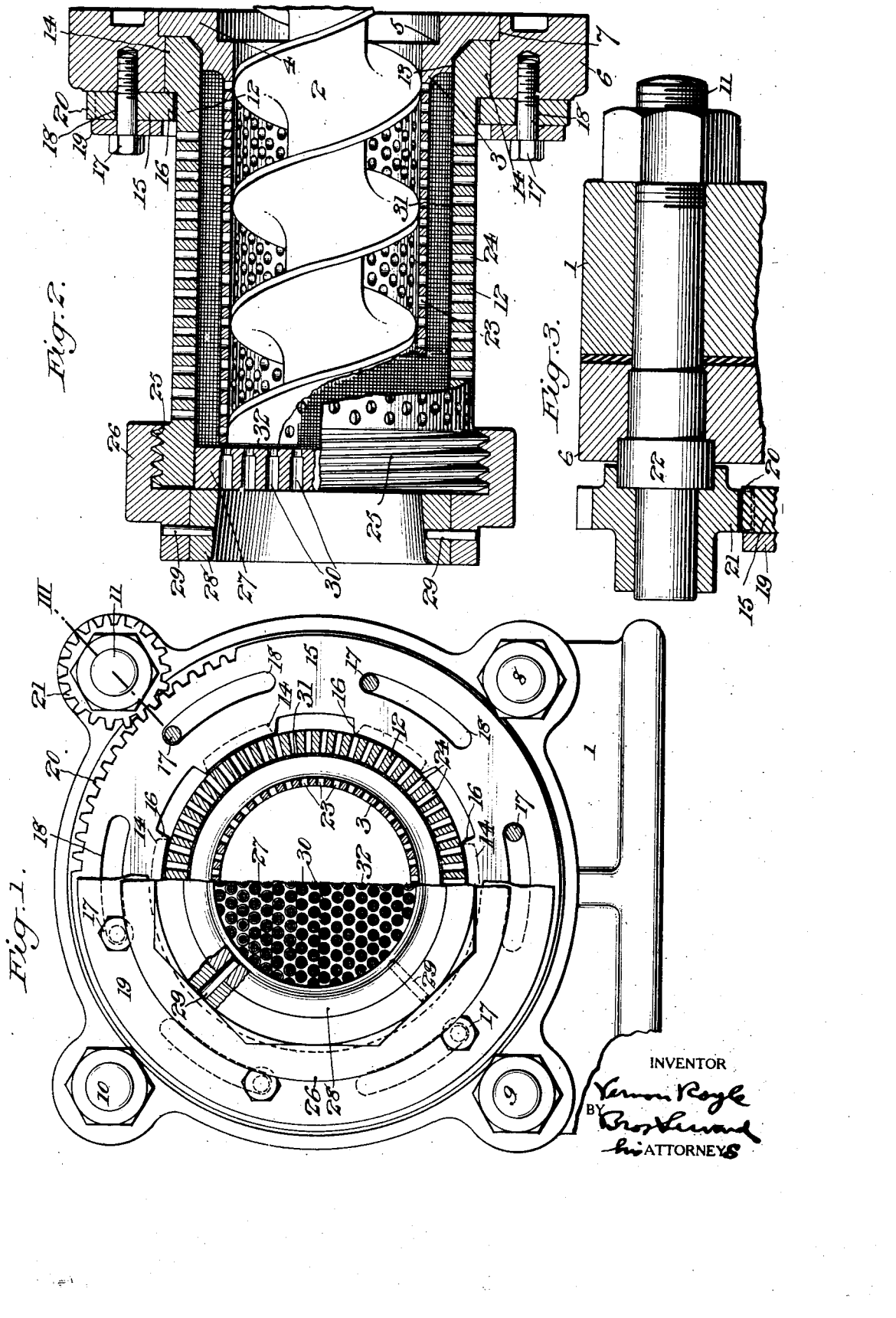

Patented Aug. 20, 1929.

1,724,967

UNITED STATES PATENT OFFICE.

VERNON ROYLE, OF PATERSON, NEW JERSEY.

STRAINER HEAD FOR TUBING MACHINES.

Application filed June 26, 1926. Serial No. 118,867.

This invention relates to a strainer head for tubing machines, and has for an object to provide a device of this character which is adapted for thorough and expeditious operation upon materials of varying characteristics, and which includes improved means for adjusting the parts and assembling them in operative position, as well as for disassembling the same.

Another object consists in providing a device of this character that includes means for preventing an undue strain from causing serious injury.

A further object consists in providing certain improvements in the form, construction and arrangement of the several parts whereby the above named and other objects may effectively be attained.

Machines of this character are designed to operate, during the process of reclaiming the rubber, upon rubber compounds that include various substances, and these compounds and substances vary greatly in consistency and individual characteristics. Consequently it is necessary to provide a strainer head which is not only strong and effective, but which may rapidly and accurately be assembled and disassembled, adjusted in proper position, and rendered proof against serious injury arising from an unusual strain due to the presence of some difficult material undergoing the operation.

A practical embodiment of the invention is represented in the accompanying drawings, in which—

Fig. 1 represents a face view partly broken away,

Fig. 2 represents a longitudinal section, and

Fig. 3 represents an enlarged detail section taken in the plane of the line III.

The strainer head is adapted for use in connection with a tubing machine of standard or appropriate form and is, as will be understood by operatives in this industry, intended to be secured to the cylinder of the tubing machine in which the screw or plodder operates.

The cylinder is marked 1 and may be of conventional form. It is adapted to receive the screw or plodder 2 that operates therein in the usual manner.

The strainer head includes an inner tubular member 3 that has a flange 4 adapted to seat against the face of the cylinder. The said member 3 is also provided with a shoulder 5 fitted to abut the end of the usual bore liner (not shown) that is mounted in the cylinder in any well known or approved manner.

A face ring 6 is shouldered, as indicated at 7, to engage the outer periphery of the flange 4, and a series of three stud bolts 8, 9, 10, and one through bolt 11, serve to firmly secure the face ring 6 to the cylinder, whereby the inner tubular member 3 is rigidly clamped in position, as shown in Fig. 2.

The strainer head also includes an outer tubular member 12 that is fashioned to fit over an annular shoulder 13 formed near the inner end of the member 3, and to abut the outer face of the flange 4. The provision of the shoulder 13 serves to hold the outer member 12 in spaced relation with respect to the inner member 3.

The inner end of the said member 12 has a series of radially projecting lugs 14 that are curved on their outer edges and adapted to fit snugly within the face ring 6.

A locking ring 15 has its inner circumference provided with lugs 16 that correspond with the lugs 14 on the member 12, and the said locking ring is arranged to be secured to the face ring 6 by a series of cap screws 17 that are threaded into the ring 6 and pass through arcuate slots 18 formed in the ring 15. A suitable annular washer 19 is provided between the heads of the cap screws 17 and the locking ring 15.

The provision of the arcuate slots 18 enables the locking ring 15 to be moved in a rotary direction, when the cap screws 17 are loosened, in order to bring the lugs 16 on the locking ring into or out of line with the lugs 14 on the member 12. When the said lugs are in line, it will be clear that the ring 15 will hold the member 12 in position against the flange 4 on the member 3; and when the said lugs are not in line, the member 12 may be removed by pulling it in an axial direction, since its lugs 14 can then pass between lugs 16.

In order to accomplish this rotary movement of the ring 15 so that its lugs shall exactly correspond with the spaces between the lugs 14 on the member 12, I provide a portion of the circumference of the ring 15 with a set of gear teeth 20, and a pinion 21 is mounted on the bolt 11 so as to be in mesh with the said teeth 20. The teeth on the pinion 21 extend inwardly just beyond the periphery of the washer 19, so that the latter prevents pinion 21 from coming off bolt 11.

The pinion 21 has its forward portion shaped like a nut for the convenient application of a wrench, whereby the pinion may be turned so as to impart movement in a rotary direction to the locking ring 15. This arrangement, which is compound in action, enables a very accurate movement of the said ring so as to precisely adjust the mutual relationship of lugs 14 and 16 for the purpose of securing the member 12 in position or removing it. If other mechanism, such as a spike or the like, were alone provided for this purpose, it would be exceedingly difficult for the workmen to impart movement in a rotary direction to the ring 15 with that nicety of degree required for ready performance of the function just described.

The bolt 11 is preferably shouldered, as indicated at 22, in order to provide a bearing for the pinion 21, and also for the purpose of clamping the face ring 6 to the cylinder 1, as clearly shown in Fig. 3.

The inner member of the strainer head 3 may have the usual perforations 23, and the outer member 12 the usual perforations 24.

The said outer member 12 has its front end provided with an exteriorly threaded rim 25 which is fitted to be engaged by a locking nut 26. An end plate 27 fits within the front end of the outer member 12, and is held in position by being clamped between the front end of the inner member 3 and a ring 28 that is secured within the locking nut 26 by pins 29. The said end plate has the usual perforations 30.

A cylindrical screen 31 is preferably inserted between the members 3 and 12, and against the inside of the member 12. It is held in position by being clamped between the inner end of the member 12 and the shoulder 13 on the member 3. A flat screen 32 is clamped between the outer end of the member 3 and the end plate 27.

This construction and arrangement of perforations and screens, is well understood in the art.

The pins 29 which secure the ring 28 in the locking nut 26 are shear pins, and are intended to give way when the pressure on the end plate 27, due to the character of the stock being handled, becomes excessive. In the absence of this construction, there is danger of the whole locking nut 26 being torn off from the end of the member 12 and, possibly, carrying with it a portion of the end of the said member. This causes serious injury, which it is somewhat expensive to repair, and which, necessarily, substantially delays the operation of the tubing machine. By providing the ring 28 with the shear pins 29, the giving way of the said pins under excessive pressure will eliminate further injury to the device, and the replacement of the ring by the use of new pins is a cheap and simple matter.

The construction just described enables the inner member 3, outer member 12, end plate 27 and screens 31 and 32 to be removed for individual cleaning, and then replaced; such removal being accomplished in a ready and expeditious manner. The readjustment of the parts in the exactly desired positions is readily assured.

It will be understood that various changes may be resorted to in the form, construction and arrangement of the several parts without departing from the spirit and scope of my invention; and hence I do not intend to be limited to the details herein shown and described except as they may be included in the claims.

What I claim is:

1. An apparatus of the character described comprising, an outer member, a device for removably locking the said member in position, and geared means for moving said device to locking and unlocking adjustment.

2. An apparatus of the character described comprising, an outer member, a device for removably locking the said member in position, and compound means for moving said device to locking and unlocking adjustment, said means including teeth on said device and a manually operable pinion meshing therewith.

3. An apparatus of the character described comprising, an outer member, a series of lugs projecting laterally therefrom, a locking ring surrounding said member and having a series of corresponding lugs on its inner circumference adapted to overlap the lugs on the member, means for securing the ring to the apparatus, and means for imparting motion in a rotary direction to the ring in order to bring its lugs into line with the lugs on the member or into line with the spaces between the lugs on the member, said last named means including teeth on the locking ring and a manually operable pinion meshing therewith.

4. An apparatus of the character described comprising, a removable member and a device for securing said member in position, said device being held by elements calculated to give way before excessive pressure in operation causes injury to the apparatus.

5. An apparatus of the character described comprising, a removable end plate and a device for securing said plate in position, said device being held by elements calculated to give way before excessive pressure in operation causes injury to the apparatus.

6. An apparatus of the character described comprising, a removable end plate and a locking nut for securing said plate in position, said locking nut having its portion which engages said plate held by shear pins, whereby said shear pins give way before excessive pressure in operation causes injury to the apparatus.

7. An apparatus of the character described comprising, an outer member, a device adapted to oscillate around said member for removably locking it in position, and rotatable means engaging said device for moving it to locking and unlocking adjustment.

In testimony, that I claim the foregoing as my invention, I have signed my name this 24th day of June, 1926.

VERNON ROYLE.